United States Patent
Hayashi et al.

(10) Patent No.: US 10,411,316 B2
(45) Date of Patent: Sep. 10, 2019

(54) BATTERY PACK FOR VEHICLE

(71) Applicant: Automotive Energy Supply Corporation, Zama-Shi, Kanagawa (JP)

(72) Inventors: Kouichi Hayashi, Zama (JP); Qiye Yang, Zama (JP); Toshifumi Takamatsu, Zama (JP)

(73) Assignee: ENVISION AESC JAPAN LTD., Kanagawa (JP)

( * ) Notice: Subject to any disclaimer, the term of this patent is extended or adjusted under 35 U.S.C. 154(b) by 239 days.

(21) Appl. No.: 15/147,496

(22) Filed: May 5, 2016

(65) Prior Publication Data
US 2016/0344073 A1 Nov. 24, 2016

(30) Foreign Application Priority Data

May 21, 2015 (JP) ................................. 2015-103337

(51) Int. Cl.
*H01M 10/6566* (2014.01)
*H01M 10/04* (2006.01)
(Continued)

(52) U.S. Cl.
CPC ......... *H01M 10/6566* (2015.04); *B60L 50/64* (2019.02); *B60L 58/26* (2019.02);
(Continued)

(58) Field of Classification Search
CPC ............ H01M 10/6566; H01M 2/305; H01M 10/0525; H01M 10/0413; H01M 10/6565; H01M 2/1077; H01M 10/647; H01M 10/667; H01M 10/663; H01M 10/625; H01M 10/613; H01M 2220/20; H02G 3/08; B60L 11/1851
See application file for complete search history.

(56) References Cited

U.S. PATENT DOCUMENTS

2013/0273755 A1* 10/2013 Yokoyama .......... B60R 16/0239
439/76.2
2015/0010795 A1 1/2015 Tanigaki et al.

FOREIGN PATENT DOCUMENTS

JP 2013171662 A 9/2013
JP 2014-93207 A 5/2014
(Continued)

OTHER PUBLICATIONS

Machine translation of Hatta JP2014-93208 (Year: 2014).*
Extended European Search Report dated Oct. 10, 2016 for the corresponding European Patent Application No. 16166923.9.

*Primary Examiner* — Lisa S Park
(74) *Attorney, Agent, or Firm* — Troutman Sanders LLP

(57) ABSTRACT

Provided is a battery pack for a vehicle including an approximately rectangular pack case, a plurality of flat box-shaped battery modules, a cooling unit, and a junction box for storing a relay, in which: the plurality of battery modules is piled up flat in the pack case so that a terminal provided on a short side of each battery module is directed in a longitudinal direction of the pack case; the cooling unit is disposed at one end of the pack case in the longitudinal direction and configured to send and circulate cooling air in the pack case along an outer periphery of the pack case; and the junction box is disposed in a most downstream side of the circulating cooling air beside the cooling unit in a width direction of the pack case.

5 Claims, 3 Drawing Sheets

(51) Int. Cl.
*H01M 2/30* (2006.01)
*H02G 3/08* (2006.01)
*H01M 2/10* (2006.01)
*H01M 10/625* (2014.01)
*H01M 10/663* (2014.01)
*H01M 10/647* (2014.01)
*H01M 10/667* (2014.01)
*H01M 10/6565* (2014.01)
*H01M 10/613* (2014.01)
*H01M 10/0525* (2010.01)
*B60L 58/26* (2019.01)
*B60L 50/64* (2019.01)

(52) U.S. Cl.
CPC ......... *H01M 2/1077* (2013.01); *H01M 2/305* (2013.01); *H01M 10/0413* (2013.01); *H01M 10/0525* (2013.01); *H01M 10/613* (2015.04); *H01M 10/625* (2015.04); *H01M 10/647* (2015.04); *H01M 10/6565* (2015.04); *H01M 10/663* (2015.04); *H01M 10/667* (2015.04); *H02G 3/08* (2013.01); *B60L 2240/545* (2013.01); *H01M 2220/20* (2013.01); *Y02T 10/7005* (2013.01); *Y02T 10/705* (2013.01)

(56) References Cited

FOREIGN PATENT DOCUMENTS

| | | |
|---|---|---|
| JP | 2015026428 A | 2/2015 |
| WO | 2014/069278 A1 | 5/2014 |

\* cited by examiner

BATTERY PACK FOR VEHICLE

CROSS-REFERENCE TO RELATED APPLICATION

This application claims priority from Japanese Patent Application No. 2015-103337 filed with the Japan Patent Office on May 21, 2015, the entire content of which is hereby incorporated by reference.

BACKGROUND

1. Technical Field

The present disclosure relates to battery packs for vehicles.

2. Related Art

Driving a vehicle requires a large-capacity secondary battery. JP-A-2013-171662 and JP-A-2015-26428 have disclosed the battery packs for vehicles, which are configured to have a plurality of flat box-shaped battery modules housed in a pack case.

In JP-A-2013-171662, some battery modules are piled up flat in the pack case (also called horizontal placement, with a major surface of the battery module placed in substantially parallel to a bottom plane of the pack case). On the other hand, many other battery modules are arranged as a single-line stack in the vertical placement (with a major surface of the battery module placed substantially perpendicular to the bottom plane of the pack case). JP-A-2015-26428 has disclosed the battery pack in which all the battery modules are disposed as double-line stacks in the vertical placement in the pack case.

SUMMARY

A battery pack for a vehicle according to an embodiment of the present disclosure includes an approximately rectangular pack case, a plurality of flat box-shaped battery modules, a cooling unit, and a junction box for storing a relay. The plurality of battery modules is piled up flat in the pack case so that a terminal provided on a short side of each battery module is directed in a longitudinal direction of the pack case. The cooling unit is disposed at one end of the pack case in the longitudinal direction and configured to send and circulate cooling air in the pack case along an outer periphery of the pack case. The junction box is disposed in a most downstream side of the circulating cooling air beside the cooling unit in a width direction of the pack case.

DETAILED DESCRIPTION

Figure 1:
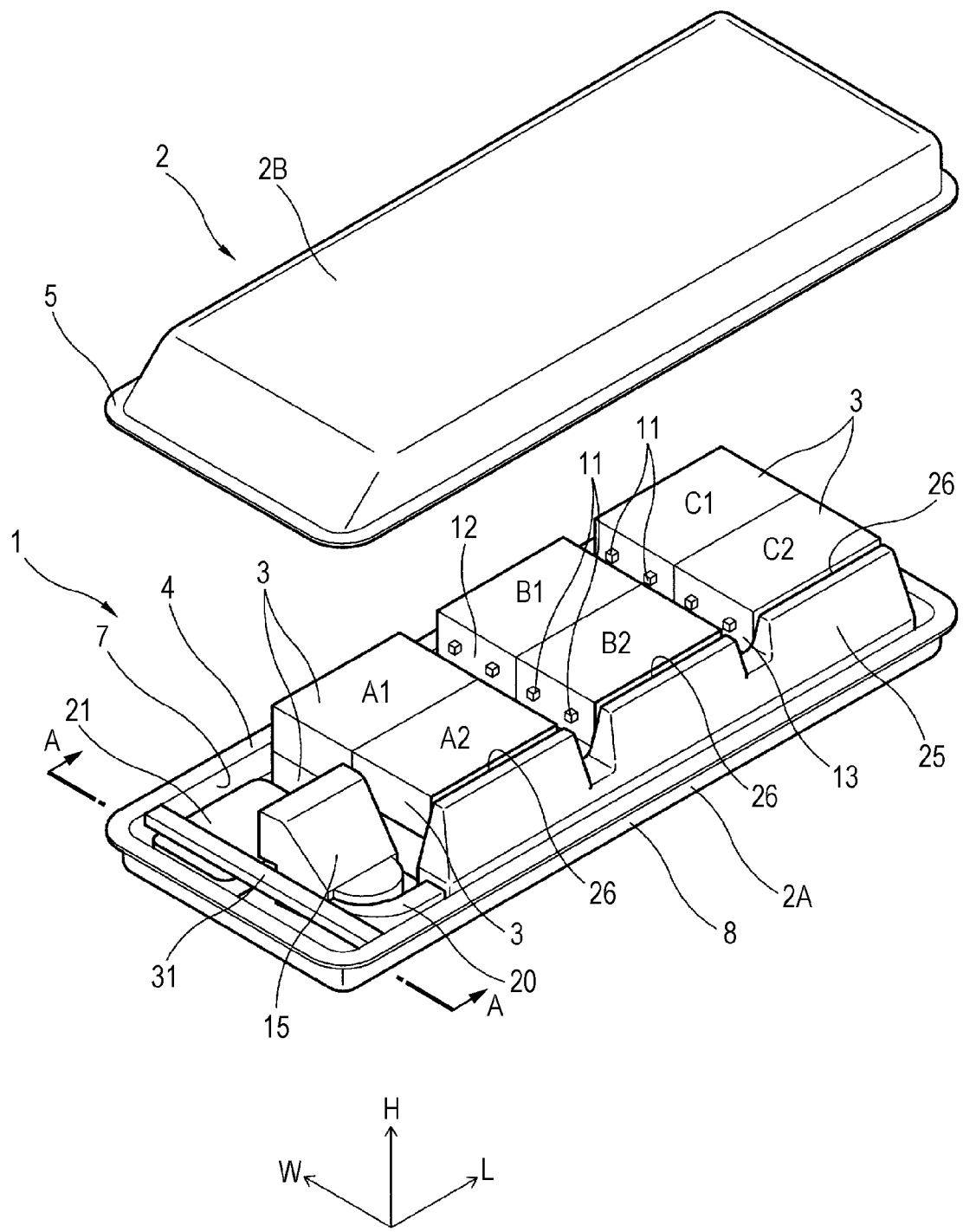
FIG. 1 is a perspective view illustrating the state in which an upper pack case member is off from a battery pack according to an embodiment of the present disclosure.
Figure 2:
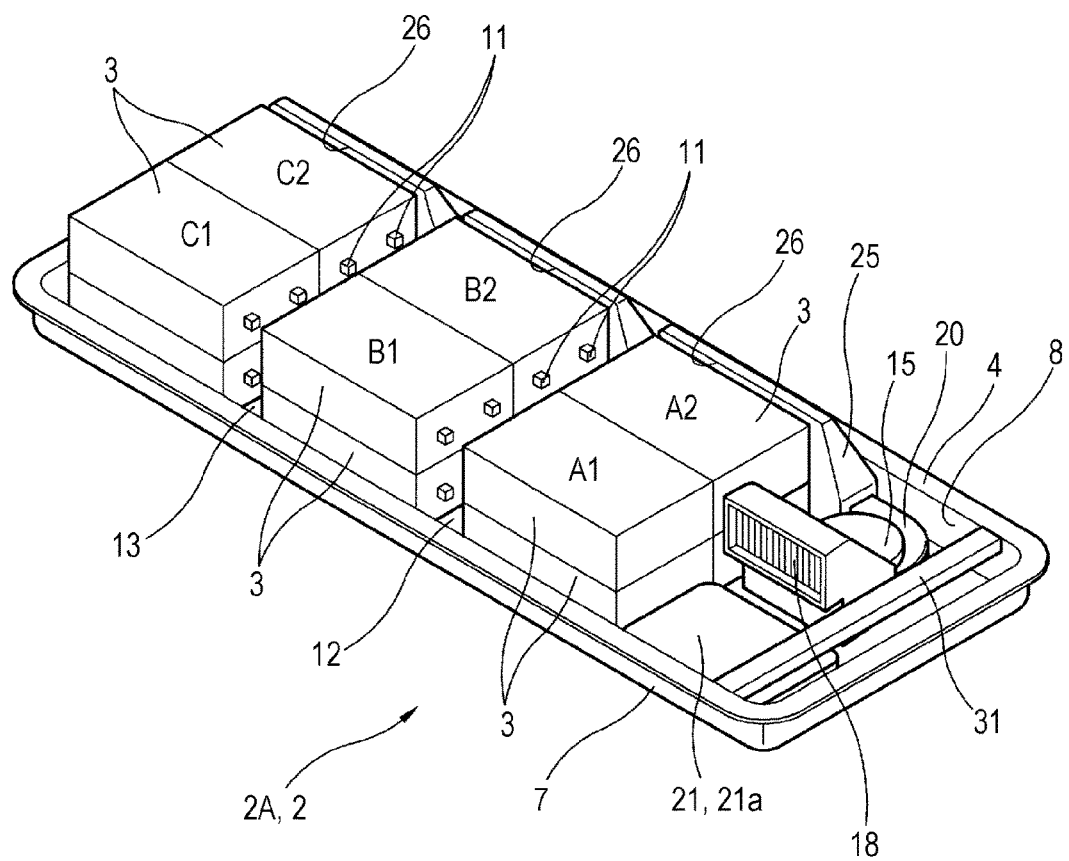
FIG. 2 is a perspective view of the battery pack illustrated in FIG. 1 which is viewed from a direction opposite to the direction in FIG. 1.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As described above, the vertical size of the battery pack for a vehicle, which has the battery modules disposed in the vertical placement in the pack case, depends on the height of the battery module substantially. This often makes it difficult to have such a battery pack mounted in other vehicles than the relatively large vehicles with large vehicle height. That is to say, the degree of freedom in the design of vehicle body floor in the vehicle height direction is restricted.

In the battery pack according to JP-A-2013-171662, some battery modules are piled up flat with the long side thereof in parallel to the vehicle width direction (in a direction orthogonal to the traveling direction). This arrangement makes the terminal of each battery module directed to the side surface of the vehicle. The design of the battery pack is therefore easily restricted by the vehicle width. If, for example, the module is used for a compact vehicle, the number of battery modules to be housed in the battery pack should be reduced.

If the battery modules are housed densely within the battery pack, a countermeasure against heat, i.e., a cooling mechanism for the battery module is necessary. For example, the battery pack disclosed in JP-A-2013-171662 is configured to have a cooling passage at the center of the battery pack. The cooling passage extends from the front end of the pack case, which faces the front surface of the vehicle, toward the rear of the pack case. The cooling passage sections the battery modules to the right and left. Specifically, the battery pack is configured so that the cooling air flowing to the rear through this cooling passage is divided in the middle to the right and left and returns to the cooling fan in the front end. This configuration enables the battery pack to have a larger size easily in the vehicle width direction. The larger size produces a complicated cooling air flow, thereby producing the relatively large pressure loss of the cooling fan.

A battery pack for a vehicle according to an embodiment of the present disclosure includes an approximately rectangular pack case, a plurality of flat box-shaped battery modules, a cooling unit, and a junction box for storing a relay. In the battery pack for a vehicle: the plurality of battery modules is piled up flat in the pack case so that a terminal provided on a short side of each battery module is directed in a longitudinal direction of the pack case; the cooling unit is disposed at one end of the pack case in the longitudinal direction and configured to send and circulate cooling air in the pack case along an outer periphery of the pack case; and the junction box is disposed in a most downstream side of the circulating cooling air beside the cooling unit in a width direction of the pack case.

In the battery pack with such a structure, the flat box-shaped battery modules are piled up flat. By setting the number of battery modules to pile up, the height of the entire battery modules to be disposed can be easily changed. This enables to design the battery pack more freely in regard to the vertical direction. The terminal at the short side of the battery module is directed to the short side of the pack case. In this structure, as long as the number of battery modules to be arranged in the vehicle width direction is the same, the battery pack is reduced in size in the vehicle width direction. That is to say, it becomes easy to configure the battery pack long and thin along the vehicle traveling direction.

The cooling air sent by the cooling unit basically circulates throughout the battery pack along the outer periphery of the pack case. Some of the cooling air is divided to go in the width direction of the battery pack between the battery modules adjacent in the front-back direction of the vehicle. The battery modules are disposed in the pack case with the terminals thereof directed to the short side of the pack case. This structure forms the space between the battery modules adjacent in the front-back direction of the vehicle, and this space serves as the flow path of the cooling air flowing along the width direction of the battery pack. This enables the smooth flow of the cooling air and suppresses the pressure loss. The battery pack is configured so that the cooling air of which temperature has risen by cooling the battery module flows around the junction box just before returning to the cooling unit. This configuration can effectively cool the junction box of which temperature becomes higher than the battery module.

According to the embodiment of the present disclosure, the battery pack can be designed more freely in regard to the vertical direction and moreover the vehicle body floor can be designed more freely in regard to the vertical direction. In addition, the restriction on the battery pack design due to the vehicle width size is reduced. For these reasons, the battery pack according to the present disclosure is suitable for the relatively small vehicles. Moreover, the battery pack can be cooled effectively with a relatively small-capacity cooling unit.

An example of the present disclosure will be hereinafter described in detail with reference to the drawings.

FIGS. 1 to 4 illustrate an example of a battery pack 1 according to the embodiment of the present disclosure. The battery pack 1 is used for relatively compact electric vehicles. The battery pack 1 is configured to have a plurality of battery modules 3 housed in an approximately rectangular pack case 2.

The pack case 2 is configured as illustrated in FIG. 1: the pack case 2 can be separated into a lower pack case member 2A constituting a lower half, and an upper pack case member 2B constituting an upper half. Each member is cast integrally into a dish-like shape using a metal material such as aluminum alloy so that the member has enough rigidity. The lower pack case member 2A and the upper pack case member 2B are integrally assembled by putting flanges 4 and 5 around the pack case members together and fastening the flanges with bolts, which are not shown.

The pack case 2 has a long and thin rectangular shape in plan view. The battery pack 1 is mounted to a vehicle, which is not shown, in the posture that the long side of the pack case 2 coincides with the vehicle traveling direction. The battery pack 1 is attached to the lower surface side of the vehicle floor so as to go along a floor tunnel portion provided for the center of the vehicle body floor along the vehicle front-back direction.

Here, for simplifying the description, the long-side direction of the long and thin pack case 2 is referred to as "front-back direction L" and the short-side direction of the long and thin pack case 2 is referred to as "width direction W" and the direction orthogonal to these directions is referred to as "vertical direction H" as denoted in FIG. 1. These terms are often used in the following description. "The front-back direction L" is substantially the same as "the vehicle traveling direction", "the vehicle front-back direction" and "the longitudinal direction of the pack case 2". "The width direction W" is substantially the same as "the vehicle width direction" and "the width direction of the pack case 2". "The vertical direction H" is the same as "the height direction". In FIG. 1, the left side corresponds to the front of the vehicle and the right side corresponds to the rear of the vehicle. In FIG. 1, similarly, the left side corresponds to the front of the pack case 2 and the right side corresponds to the rear of the pack case 2.

Thus, the pack case 2 is shorter in the width direction W than in the front-back direction L, and shorter in the vertical direction H than in the width direction W. The pack case 2 has a flat and approximately rectangular shape.

The battery module 3 is configured to have a flat box-like shape with a pair of rectangular major surfaces (largest planes). The battery modules 3 are piled up flat in the pack case 2 (with the major surfaces of the battery modules 3 in substantially parallel to the bottom plane of the pack case 2, also called horizontal placement). Specifically, two battery modules 3 are arranged in the width direction W and three battery modules 3 are arranged in the front-back direction L. In the vertical direction H, the battery modules 3 are stacked in a plurality of stages, for example, two stages. That is to say, a stack of battery modules 3 piled up vertically in two stages is placed at six positions in total in the form of 2×3 in plan view. In this manner, twelve battery modules 3 are housed in the pack case 2. In order to identify each stack, the stacks are denoted by A1, A2, B1, B2, C1, and C2 for the convenience. The stacks A1 and A2 are on the front side than in the pack case 2. Specifically, the stack A1 is closer to the right side of the vehicle and the stack A2 is closer to the left side of the vehicle. The stacks C1 and C2 are on the rear side in the pack case 2. Specifically, the stack C1 is closer to the right side of the vehicle and the stack C2 is closer to the left side of the vehicle. The stacks B1 and B2 are in the middle in the front-back direction L. Specifically, the stack B1 is closer to the right side of the vehicle and the stack B2 is closer to the left side of the vehicle.

The number of stacks to pile up in the vertical direction H can be individually set in accordance with the shape of the vehicle body floor. This makes it possible to design the uneven shape and the height of the upper surface of the upper pack case member 2B and the vehicle floor more freely.

The battery module 3 includes a plurality of unit cells housed in a metal case. A side surface of the flat rectangular case along the short side is provided with positive and negative battery terminals 11. The battery terminal 11 has a rectangular shape and projects from the side surface. The unit cell to be housed in the battery module 3 may be a flat lithium ion battery as described below, though this battery is not shown. This lithium ion battery includes a flexible package including an electrode stack, an electrolyte solution, and a laminate film. The electrode stack includes a number of sheet-shaped positive electrodes and negative electrodes that are alternately stacked with the separator interposed therebetween. This electrode stack is housed together with the electrolyte solution in the package. The plurality of flat unit cells is stacked in the thickness direction of the battery module 3, i.e., in the vertical direction H in FIG. 1.

Within the pack case 2, the battery modules 3 are arranged having their long side coincide with the front-back direction L. The two stacks or battery modules 3 that are adjacent to each other in the width direction W are close to each other with almost no space therebetween. That is to say, the two stacks A1 and A2 have their side surfaces corresponding to the long side adjacent to each other. Similarly, the two stacks B1 and B2 have their side surfaces corresponding to the long side adjacent to each other. Additionally, the two stacks C1 and C2 have their side surfaces corresponding to the long side adjacent to each other. The stacks are supported and fixed on the lower pack case member 2A through a bracket, which is not shown.

Figure 4:
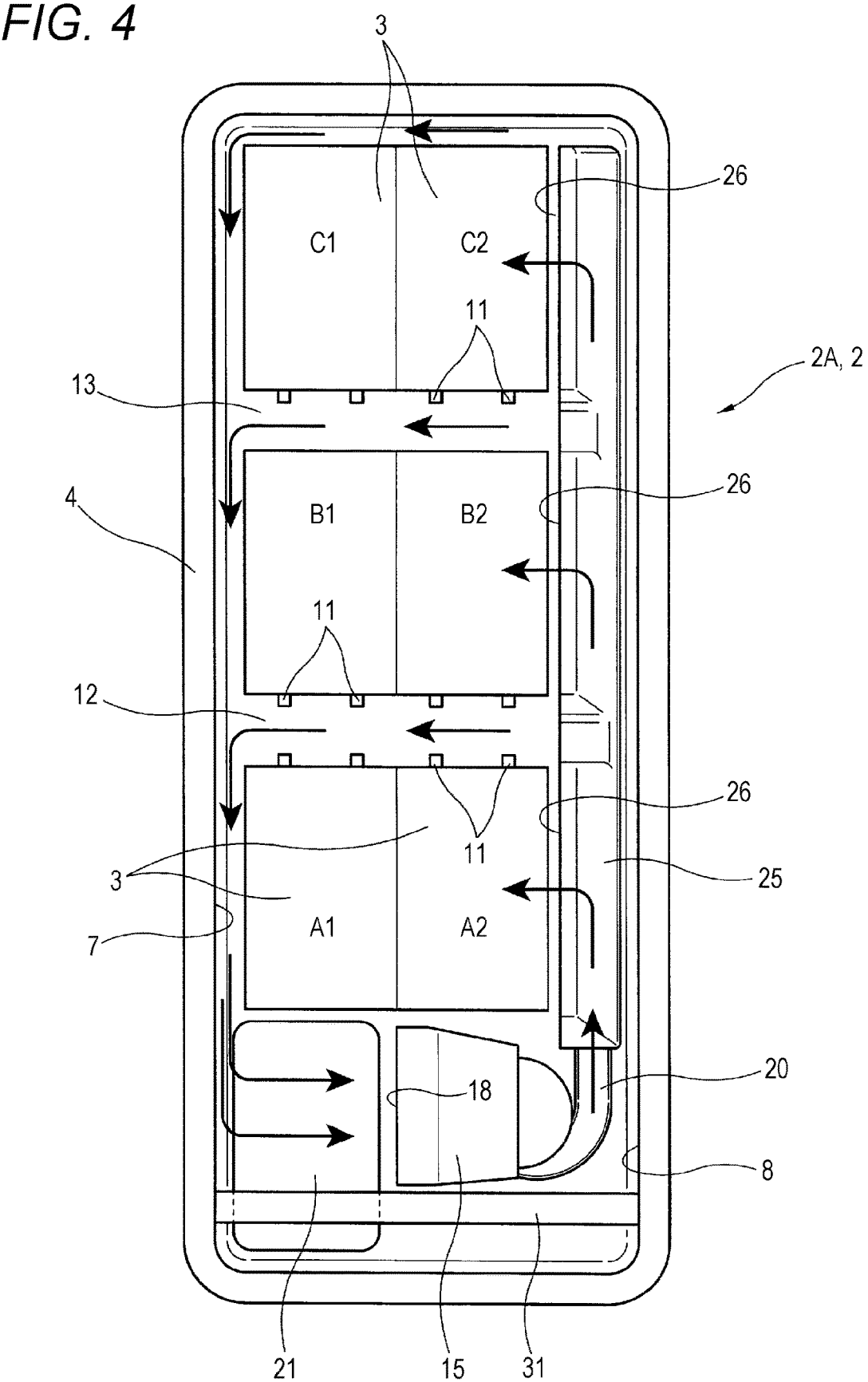
FIG. 4 is a plan view illustrating the flow of the cooling air in the pack case.

The terminals 11 of each battery module 3 are provided for the side surface corresponding to the short side of the battery module 3 as described above. Therefore, each battery module 3 has the posture that the terminals 11 are in the front-back direction L of the pack case 2. Specifically, as illustrated in FIG. 4, four battery modules 3 included in the stacks A1 and A2 are arranged so that the side surfaces corresponding to the short side having the terminals 11 are directed to the rear. The eight battery modules 3 included in the stacks B1, B2, C1, and C2 are arranged so that the side surfaces corresponding to the short side having the terminals 11 are directed to the front.

Between the two stacks or battery modules 3 adjacent in the front-back direction L, i.e., between the stacks A1 and A2 and the stacks B1 and B2 and between the stacks B1 and B2 and the stacks C1 and C2, are provided a space 12 and a space 13, respectively. The spaces 12 and 13 are required in the work of connecting a bus bar or a harness (not shown) to the terminals 11 and are provided to form a passage continuing in the width direction W. That is to say, the stacks A1 and A2 and the stacks B1 and B2 are disposed separate from each other with a space formed in the front-back direction L. Similarly, the stacks B1 and B2 and the stacks C1 and C2 are disposed separate from each other with a space in the front-back direction L.

The stacks C1 and C2 in the rear are relatively close to the rear end of the pack case 2. On the other hand, the stacks A1 and A2 in the front are positioned apart from the front end of the pack case 2 in the front-back direction L. The space between the stacks A1 and A2 and the front end of the pack case 2 houses a cooling unit 15 that circulates the cooling air within the pack case 2 and a junction box 21 that contains a plurality of relays. The cooling unit 15 and the junction box 21 are disposed side by side in the width direction W of the pack case 2. On the right side, i.e., the stack A1 side, the junction box 21 is installed. On the left side, i.e., the stack A2 side, the cooling unit 15 is installed. In other words, the cooling unit 15 and the junction box 21 are disposed in the front end of the pack case 2. In the space behind the cooling unit 15 and the junction box 21, the stacks A1 to C2 of the battery modules 3 are installed.

Figure 3:
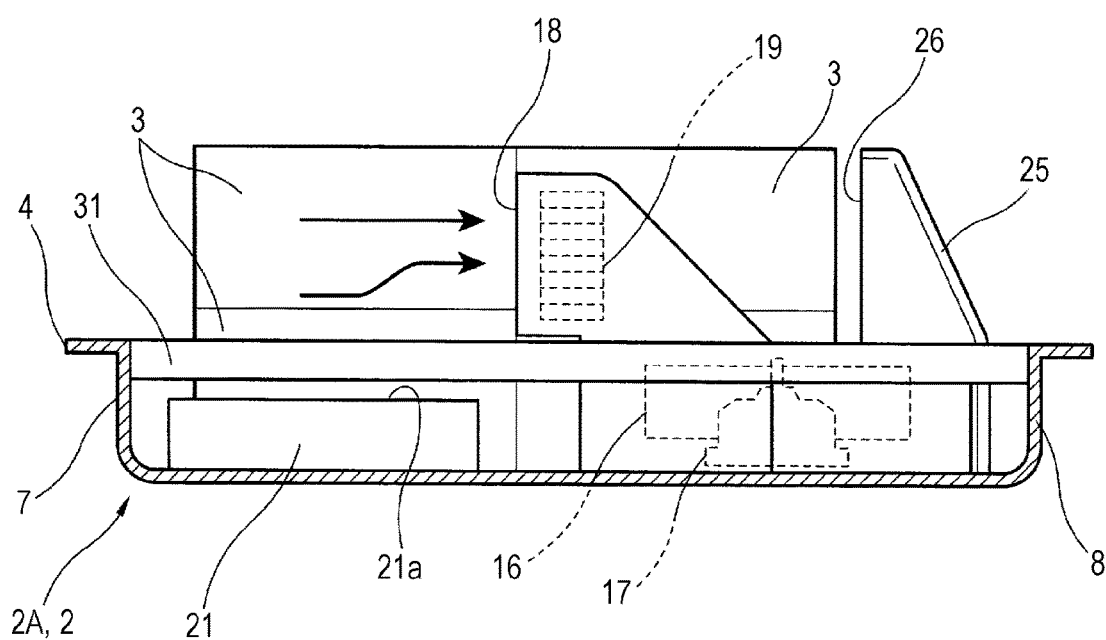
FIG. 3 is a sectional view taken along line A-A of FIG. 1.

The cooling unit 15 may be, for example, a sirocco fan unit. This cooling unit sends air in the centrifugal direction by rotating a cylindrical multiblade fan 16 with an electric motor 17. A rectangular suction port 18 extending long and thin in the front-back direction L is open toward one end in the width direction W. Specifically, the suction port 18 is open toward the junction box 21. The suction port 18 is particularly provided at the high position of the cooling unit 15. As illustrated in FIG. 3, an evaporator 19 is provided at the back of the suction port 18. With the cooling medium supplied from the outside to the evaporator 19, the cooling air that circulates in the pack case 2 is cooled.

A discharge port 20 of the cooling unit 15 is connected to an air supplying duct 25. The air supplying duct 25 extends linearly in the front-back direction L along one long side of the pack case 2. The air supplying duct 25 has three outlets 26 that open toward the side surfaces of the stacks A2, B2, and C2.

The junction box 21 includes a number of relays and fuses housed in the flat box-shaped case. As illustrated in FIG. 3, the junction box 21 is shorter than the cooling unit 15 in the vertical direction H. This structure makes the suction port 18 of the cooling unit 15 open at the relatively high position as compared to the junction box 21. The suction port 18 is open toward the junction box 21 but is not covered with the junction box 21. In one example, the lower edge of the suction port 18 is higher than an upper surface 21a of the junction box 21.

The front end of the lower pack case member 2A is provided with a reinforcement bar 31 extending linearly in the width direction W. The reinforcement bar 31 connects between a pair of side walls 7 and 8 (see FIG. 3). The reinforcement bar 31 has the opposite ends thereof supported and fixed by the flange 4 of the lower pack case member 2A through a bracket (not shown). The reinforcement bar 31 is disposed to go over the junction box 21 as illustrated in FIG. 3. That is to say, the junction box 21 is set with one end in the front-back direction L going under the reinforcement bar 31. The suction port 18 of the cooling unit 15 is open above the reinforcement bar 31.

As described above, the battery pack 1 according to the embodiment is configured so that the battery modules 3 are piled up flat in the long and thin pack case 2 along the vehicle traveling direction (front-back direction L) and moreover the terminals 11 are directed in the front-back direction L. This configuration makes it possible to design the battery module 3 more freely in regard to the vertical direction H and moreover to shorten the size of the battery module 3 in the width direction W. Thus, for example, the battery can be easily mounted on the compact vehicle with the restricted floor area.

The cooling air supplied by the cooling unit 15 basically flows along the outer periphery of the pack case 2 as shown by arrows in FIG. 4. Along with this flow, the cooling air flows in the width direction W through the space 12 between the stacks A1 and A2 and the stacks B1 and B2 and the space 13 between the stacks B1 and B2 and the stacks C1 and C2. Between the side wall 7 of the lower pack case member 2A and the stacks A1, B1, and C1 is maintained a space for installing harnesses and the like, which are not shown. This constitutes the flow paths continuing linearly in the front-back direction L. The flow of the cooling air in the pack case 2 is simple and the pressure loss due to the flow is relatively small. Based on this, enough cooling is possible with the compact and small-capacity cooling unit 15. Accordingly, the noise and the power consumption resulted from the cooling can be suppressed.

The spaces 12 and 13 in the front-back direction L between the stacks forming the flow path along the width direction W also serve as the space necessary to connect the terminals 11. Therefore, the battery pack 1 according to the embodiment is advantageous in achieving both the size reduction of the battery pack and the formation of the cooling air flow path.

Here, the junction box 21, which generates heat like the battery modules 3, is located at the most downstream side of the cooling air flow in the pack case 2, i.e., the position just before the suction port 18 of the cooling unit 15. The junction box 21 usually becomes hotter than the battery module 3. After passing around the battery modules 3, the cooling air may have higher temperature by a certain degree. However, since the junction box 21 is hotter, the cooling air with the increased temperature has a temperature difference enough to cool the junction box 21. Thus, the efficient cooling operation by the cooling air can be achieved. By disposing the junction box 21 in the most downstream side of the cooling air, both the battery modules 3 and the junction box 21 can be efficiently cooled with the cooling air with the limited capacity. The suction port 18 of the cooling unit 15 is open at the relatively high position as compared to the junction box 21. This arrangement does not interrupt the air intake into the cooling unit 15 by the multiblade fan 16. As shown by arrows in FIG. 3, the cooling air flowing along the upper surface 21a of the junction box 21 cools the junction box 21. The air with the high temperature having returned to the cooling unit 15 is cooled by the heat exchange with the cooling medium in the evaporator 19. After that, the cooling air is sent toward the battery modules 3 again.

In the illustrated example, the air supplying duct 25 is provided along the long side of the pack case 2. The air supply duct 25, however, may be omitted and in this case, the space is still needed between the side wall 8 of the lower pack case member 2A and the stacks A2, B2, and C2 for installing the harness and the like, which are not shown. This space forms the flow path extending linearly in the front-back direction L, and along this flow path, the cooling air circulates as indicated by the arrows in FIG. 4.

In this example, the reinforcement bar 31 passing above the junction box 21 is provided. This reinforcement bar 31 is connected to the right and left flanges 4 of the lower pack case member 2A. Even if the external force is applied from above the battery pack 1 in the occurrence of, for example, vehicle crash, the junction box 21 through which the large current flows can be protected for sure.

In the battery pack 1 in the above example, the junction box 21 and the cooling unit 15 are disposed in the front end. When the battery pack 1 is mounted on the vehicle, the junction box 21 and the cooling unit 15 are located closest to the area in front of the driver's seat (area corresponding to the engine compartment of a vehicle with an internal combustion engine). In general, a controller to be connected to the junction box 21 and an air-conditioning system to be connected to the cooling unit 15 are disposed in the area in front of the driver's seat. The above structure enables the connection between the controller and the cooling unit, and the battery pack at the shortest distance.

The battery pack for a vehicle according to the present disclosure may be any of the following first to fifth battery packs for a vehicle.

The first battery pack for a vehicle is a battery pack for a vehicle, in which: a plurality of flat box-shaped battery modules is piled up flat inside an approximately rectangular pack case that is mounted on a vehicle in a posture having a long side of the pack case coincide with a vehicle traveling direction; the battery modules are disposed with a terminal on a short side of the battery module directed in a longitudinal direction of the pack case; a cooling unit that circulates cooling air in the pack case and a junction box storing a plurality of relays are disposed in one end of the pack case in the longitudinal direction side by side in a width direction of the pack case; the cooling unit is configured to send the cooling air along an outer periphery of the pack case; and the junction box is disposed in the most downstream side of the cooling air.

The second battery pack for a vehicle is the first battery pack for a vehicle, in which the cooling unit includes an evaporator to which a cooling medium is supplied from outside the pack case.

The third battery pack for a vehicle is the first or second battery pack for a vehicle, in which the cooling unit has a suction port opening toward the adjacent junction box, the suction port being provided at a relatively higher position than the junction box.

The fourth battery pack for a vehicle is any of the first to third battery packs for a vehicle, in which the cooling unit and the junction box are disposed at a front end of the vehicle in a vehicle traveling direction.

The fifth battery pack for a vehicle is any of the first to third battery packs for a vehicle, which includes a reinforcement bar at one end in the longitudinal direction of the pack case including the junction box, the reinforcement bar extending in the width direction of the pack case and connecting between a pair of side walls of the pack case, in which the reinforcement bar crosses above the junction box.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. A battery pack for a vehicle, comprising:
a substantially rectangular shaped pack case;
a plurality of flat box-shaped battery modules each comprising a short side, a long side perpendicular to the short side, and a pair of opposing flat surfaces to form a rectangular box shape* wherein the pair of opposing flat surfaces are major surfaces, comprise the largest planes, and are rectangular,
wherein all the plurality of flat box-shaped battery modules in the pack case are piled up flat within the pack case such that the pair of opposing flat surfaces of each of the plurality of flat box-shaped battery modules are substantially parallel to a vehicle-heightwise bottom surface of the pack case;
a junction box storing a relay; and
a cooling unit comprising:
a discharge port circulating cooling air along a first longitudinal side of the pack case, and
a suction port drawing in the cooling air circulated within the pack case along a second longitudinal side of the pack case toward the cooling unit,
wherein the junction box is disposed on the downstream side of the circulating cooling air closest to the suction port,
wherein
all of the plurality of battery modules in the pack case are piled up on the flat surfaces in the pack case so that a terminal provided on the short side of each battery module is directed in a longitudinal direction of the pack case,
the cooling unit is disposed at one end of the pack case in the longitudinal direction and configured to,
send and circulate the cooling air in the pack case along an outer periphery of the pack case, and
send and circulate the cooling air in the short side direction of the pack case,
from the long side to a second long side, through a space between the flat box-shaped battery modules, and
the junction box is disposed in a most downstream side of the circulating cooling air beside the cooling unit in a width direction of the pack case.
2. The battery pack for a vehicle according to claim 1, wherein the cooling unit includes an evaporator to which a cooling medium is supplied from outside the pack case.

3. The battery pack for a vehicle according to claim 1, wherein the cooling unit has a suction port opening toward the adjacent junction box, a bottom of the suction port being provided at a higher vertical position than an upper surface of the junction box.

4. The battery pack for a vehicle according to claim 1, wherein the cooling unit and the junction box are disposed in the vehicle at a front end of the vehicle.

5. The battery pack for a vehicle according to claim 1, wherein
- the pack case including the junction box has a reinforcement bar at one end in the longitudinal direction, the reinforcement bar extending in the width direction of the pack case and connecting between a pair of side walls of the pack case, and
- the reinforcement bar passes above a portion of the junction box.

* * * * *